United States Patent
Patil et al.

(10) Patent No.: US 11,616,770 B2
(45) Date of Patent: Mar. 28, 2023

(54) SYSTEMS AND METHODS FOR AUTHENTICATING USER DEVICES

(71) Applicant: Verizon Patent and Licensing Inc., Basking Ridge, NJ (US)

(72) Inventors: Sudhakar Reddy Patil, Flower Mound, TX (US); Lixia Yan, Basking Ridge, NJ (US); James Mathison, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 364 days.

(21) Appl. No.: 17/072,084

(22) Filed: Oct. 16, 2020

(65) Prior Publication Data

US 2022/0124079 A1   Apr. 21, 2022

(51) Int. Cl.
  *H04L 9/40*   (2022.01)
(52) U.S. Cl.
  CPC .................................. *H04L 63/08* (2013.01)
(58) Field of Classification Search
  CPC ........ H04W 12/72; H04W 12/06; H04L 63/08
  USPC ............................................................ 726/7
  See application file for complete search history.

(56) References Cited

U.S. PATENT DOCUMENTS

| 10,993,200 B1* | 4/2021 | Sihotang | H04W 8/186 |
| 11,265,698 B2* | 3/2022 | Sihotang | H04W 80/10 |
| 2022/0039003 A1* | 2/2022 | Castellanos Zamora | |
| | | | H04W 8/20 |

* cited by examiner

*Primary Examiner* — Benjamin A Kaplan

(57) ABSTRACT

A method may include receiving, from a user device, a registration request that includes a subscription concealed identifier (SUCI), identifying a network element to decode the SUCI and forwarding the SUCI to the identified network element. The method may also include decoding the SUCI to identify a subscription permanent identifier (SUPI), identifying a unified data management (UDM) device associated with the SUPI and transmitting an authentication request to the identified UDM device to obtain authentication information associated with the user device. The method may further include receiving the authentication information and authenticating the user device based on the received authentication information.

20 Claims, 7 Drawing Sheets

SYSTEMS AND METHODS FOR AUTHENTICATING USER DEVICES

BACKGROUND INFORMATION

In a telecommunications system, a network operator typically allocates a unique identifier, such as International Mobile Subscriber Identify (IMSI) and/or a Fifth Generation (5G) Subscription Permanent Identifier (SUPI), to each subscriber identity module (SIM) card when the SIM card is manufactured or provisioned. To avoid privacy breaches associated with transmitting IMSI/SUPI data in plain text over a radio access link, the network operator also typically assigns a temporary identifier, such as a Global Unique Temporary Identifier (GUTI) to a SIM card. The GUTI may then be used for identification purposes.

However, in some situations, the use of a temporary identifier is not possible. For example, when a user device registers with a network for the first time, the service provider has not yet assigned a temporary identifier to the user device. In such situations, the 3rd Generation Partnership Project (3GPP) has introduced the use of encryption to transmit a SUPI over a radio access link. For example, if a 5G device registers with a network, the 5G device may transmit a Subscription Concealed Identifier (SUCI) that includes an encrypted or encoded SUPI to allow the user device to avoid transmitting the SUPI via plain text.

DETAILED DESCRIPTION OF EXAMPLE EMBODIMENTS

The following detailed description refers to the accompanying drawings. The same reference numbers in different drawings may identify the same or similar elements.

Implementations described herein provide for authenticating user devices without exposing a user's permanent identifier, such as a SUPI, via a plain text transmission over a radio link. For example, in situations in which a user would like to register for network service, the user device may not be assigned a temporary identifier. In such instances, a routing indicator included in a SUCI may contain information that identifies an authentication device that includes information that will be used to authenticate the user device.

However, some service providers may include a number of distributed devices with databases that store the authentication information for a number of user devices based on geography or location associated with the user devices. For example, a service provider may distribute one or more authentication devices in the East for users located on the east coast, one or more authentications device in the Midwest for users located in the Midwest, one or more authentication devices in the West for users located on the west coast, etc. Using a number of authentication devices distributed over a service area that may include the entire country enables the service provider to more quickly and efficiently authenticate user devices. However, in some service provider networks, the routing indicator that is included in a SUCI may be assigned a value that is not useful in identifying where the authentication information for a particular user device is stored. For example, the SIM card manufacturer for the user device may assign a default value as the routing indicator. In such situations, determining which device/database stores the authentication information for a particular user device is not possible based on the default routing indicator.

Implementations described herein may identify a network element to decode or decrypt the SUCI received with an initial registration request from a user device to determine the SUPI for the user device. The SUPI may then be used to identify the authentication device that stores the authentication information for that particular user device and that will be used to authenticate the user device. In this manner, the user may be authenticated without using a routing indicator. This may allow the service provider to provide a scalable and efficient way to authenticate the user device in its initial attach procedure when the SIM card does not include a relevant routing indicator for that service provider. This may also allow the service provider to distribute authenticating devices across the network based on geography and/or rate center related designations associated with the locations of user devices.

Figure 1:
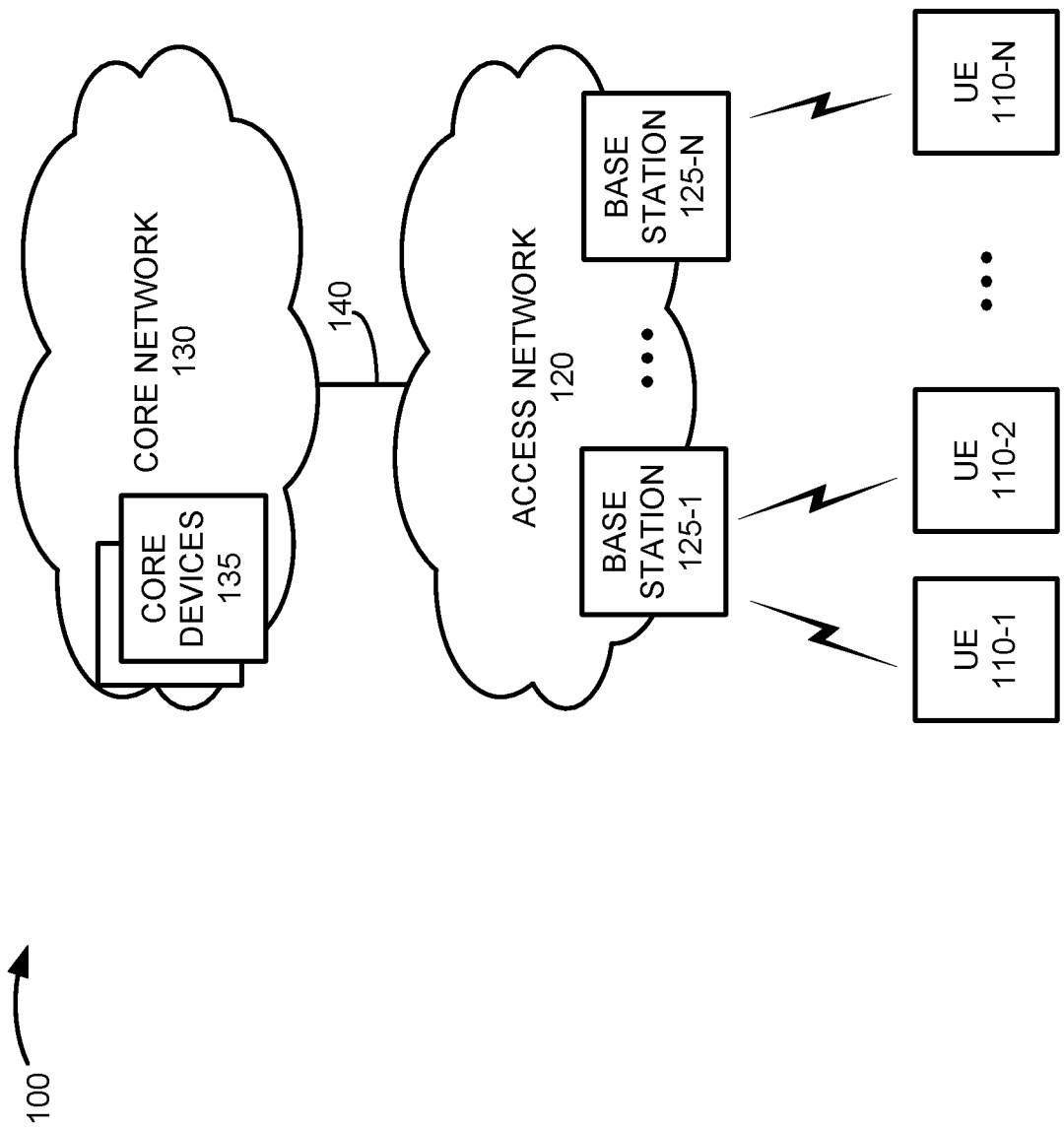
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes user equipment (UE) devices 110-1 through 110-N (collectively referred to as UEs 110 or UE devices 110 and individually as UE 110 or UE device 110), access network 120 and core network 130. Elements of environment 100 may include network devices, network elements and/or network functions (referred to herein as network devices) that may be implemented according to one or multiple network architectures (e.g., a client device, a server device, a peer device, a proxy device, a cloud device, a virtualized function, and/or another type of network architecture (e.g., Software Defined Network (SDN), virtual, logical, network slicing, etc.)). Additionally, a network device, element or function may be implemented according to various computing architectures, such as centralized, distributed, cloud (e.g., elastic, public, private, etc.), edge, fog, and/or another type of computing architecture.

Environment 100 includes communication links between devices, such as links between UEs 110 and access network 120 and links between access network 120 and core network 130, such as link 140. The links in environment 100 may include wired, optical, and/or wireless communication links. In addition, connections between devices in environment 100 may be direct or indirect.

UEs 110 may each include a mobile device, such as wireless or cellular telephone device (e.g., a conventional cell phone with data processing capabilities), a smart phone, a personal digital assistant (PDA) that can include a radiotelephone, etc. In another implementation, UE 110 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. In other implementations, UEs 110 may be implemented as a machine-type communications (MTC) device, an Internet of Things (IoT) device, a machine-to-machine (M2M) device, etc., that includes communication functionality, such as a home appliance device, a home monitoring device, a camera, etc. UEs 110 may connect to access network 120 in a wireless manner. UE 110 and the person associated with UE 110 (e.g., the party holding or using UE 110) may be referred to collectively as UE 110 in the description below.

In an exemplary implementation, UEs 110 use wireless channels to communicate with base stations 125. The wireless channels may correspond, for example, to a physical layer in accordance with different radio access technology (RAT) types. For example, wireless channels may correspond to physical layer associated with Fifth Generation (5G) New Radio (NR) standards. In other implementations, the wireless channels may correspond to physical layers associated with Fourth Generation Long Term Evolution (4G LTE), 4.5G or other air interfaces. In an exemplary implementation, UEs 110 may be 5G-capable devices that provide voice communication, mobile broadband services (e.g., video streaming, real-time gaming, high speed Internet access etc.), best effort data traffic, and/or other types of applications via a 5G NR service using various frequency bands, including millimeter wave (mmWave) radio frequencies.

Access network 120 may include a radio access network (RAN) that provides a connection between UEs 110 and core network 130. For example, access network 120 may include base stations 125-1 through 125-N (referred to collectively as base stations 125 and individually as base station 125 or base station 125-x). Access network 120 and base stations 125 may support multiple networks of multiple types and technologies. In an exemplary implementation, access network 120 may include a 5G RAN, a 4.5G RAN, a 4G RAN, and/or another type of future generation RAN. According to various exemplary implementations, access network 120 may also be implemented to include various architectures associated with wireless services, such as, for example, macrocell, microcell, femtocell, picocell, metrocell, 5G NR cell, LTE cell, non-cell, or another type of cell architecture.

Each base station 125 may service a number of UEs 110. In one implementation, base station 125 may include a 5G base station (e.g., a next generation NodeB (gNB)) that includes one or more radio frequency (RF) transceivers. For example, base station 125 may include three RF transceivers and each RF transceiver may service a 120 degree sector of a 360 degree field of view. Each RF transceiver may include or be coupled to an antenna array. The antenna array may include an array of controllable antenna elements configured to send and receive 5G NR wireless signals via one or more antenna beams. In some implementations, base station 125 may also include a 4G base station (e.g., an evolved NodeB (eNB)) that communicates wirelessly with UEs 110 located within the service range of base station 125. In still other implementations, base station 125 may include a radio network controller (RNC), a remote radio head (RRH), a baseband unit (BBU), a small cell node (e.g., a picocell device, a femtocell device, a microcell device, a home eNB, a repeater, etc.), or another type of wireless node.

Core network 130 may include one or more wired, wireless and/or optical networks that are capable of receiving and transmitting data, voice and/or video signals. For example, core network 130 may include one or more public switched telephone networks (PSTNs), one or more satellite networks, one or more packet switched networks, such as an Internet protocol (IP) based network, a software defined network (SDN), a local area network (LAN), a personal area network (PAN), a WiFi network, a Bluetooth network, a wide area network (WAN), a 5G network, a 4G network, a 4G LTE Advanced network, an intranet, the Internet, or another type of network that is capable of transmitting data. Core network 130 may provide packet-switched services and wireless Internet protocol (IP) connectivity to various components in environment 100, such as UEs 110 to provide, for example, data, voice, and/or multimedia services.

In an exemplary implementation, core network 130 may include various types of network devices, such as core devices 135. In an exemplary implementation, core devices 135 may include elements of a 5G network used to authenticate UEs 110, as described in detail below.

The exemplary configuration illustrated in FIG. 1 is provided for simplicity. It should be understood that a typical environment may include more or fewer devices than illustrated in FIG. 1. For example, environment 100 may include a large number (e.g., hundreds or more) of UEs 110 and base stations 125, as well as multiple access networks 120 and/or core networks 130. Environment 100 may also include elements, such as switches, gateways, routers, monitoring devices, etc. (not shown), that aid in routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
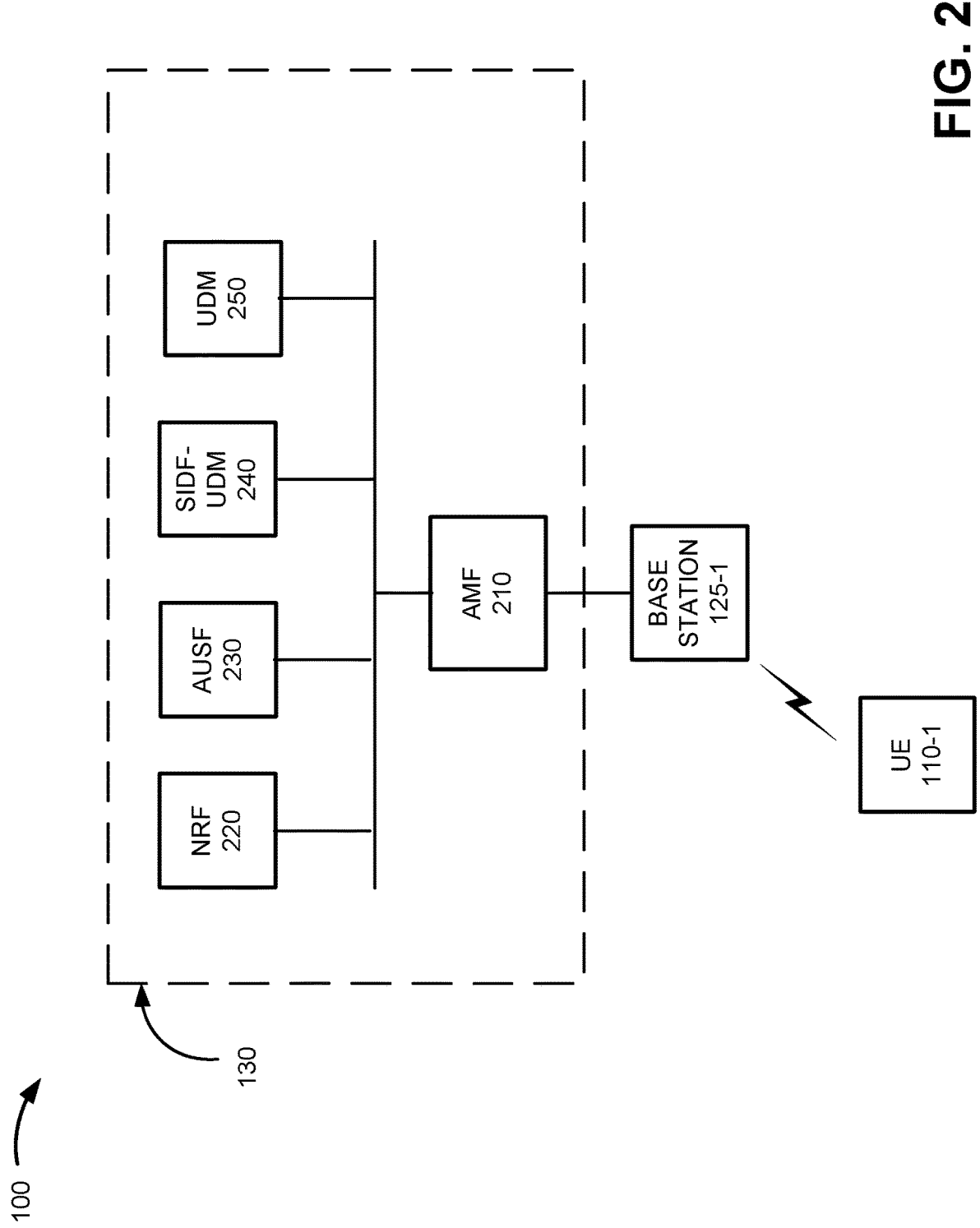
FIG. 2 illustrates elements implemented in the core network of FIG. 1 in accordance with an exemplary implementation.

FIG. 2 is a functional block diagram of a portion of environment 100 in accordance with an exemplary implementation. Referring to FIG. 2, core network 130 includes various network elements or functions, such as Access and Mobility Function (AMF) 210, Network Repository Function (NRF) 220, Authentication Server Function (AUSF) 230, Subscriber Identity De-concealing Function-Unified Data Management (SIDF-UDM) 240 and Unified Data Management (UDM) 250. These elements may be implemented in one or more core devices 135.

Core network 130 may also include other network devices/functions not shown in FIG. 2, such as a Unified Data Repository (UDR), a User Plane Function (UPF), a Session Management Function (SMF), an Application Function (AF), a Policy Control Function (PCF), a Charging Function (CHF), an Unstructured Data Storage Network Function (UDSF), a Network Slice Selection Function (NSSF), a 5G Equipment Identity Register (EIR). a Network Data Analytics Function (NWDAF), a Short Message Service Function (SMSF), a Security Edge Protection Proxy (SEPP), a packet gateway (PGW), a serving gateway (SGW), a home subscriber server (HSS), an authentication, authorization, and accounting (AAA) server, a mobility management entity (MME), a policy charging and rules function (PCRF), a charging system (CS), etc.

UE 110-1 may communicate with core network 130 via base station 125. For example, UE 110-1 may connect to base station 125 when attempting to initially register for service with core network 130. Base station 125 may forward the communications from UE 110-1 to AMF 210 to initiate the registration, as described in detail below.

AMF 210 may perform registration management, connection management, reachability management, mobility management, lawful intercepts, Short Message Service (SMS) transport between UE 110 and a Session Management Session Function (not shown), session management messages transport between UE device 110 and a session management function (SMF) (not shown), access authentication and authorization, location services management, functionality to support non-3GPP access networks, and/or other types of management processes. AMF 210 may be accessible by other function nodes via one or more interfaces.

NRF 220 may support a service discovery function and maintain profiles of available network function (NF) devices/instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 220 may include one or more transport network key performance indicators (KPIs) associated with the NF device/instance. NRF 220 may be accessible via one or more interfaces.

AUSF 230 may perform authentication for core network 130. For example, AUSF 230 may implement an Extensible Authentication Protocol (EAP) authentication server and may use authentication keys for UEs 110, such as authentication keys store in a UDR (not shown), to authenticate UEs 110. AUSF 230 may be accessible via one or more user interfaces SIDF-UDM 240 may include logic to support decoding or decrypting a SUCI to obtain the SUPI for a UE 110 (e.g., UE 110-1), as described in detail below. SIDF-UDM 240 may also include a UDM or be co-located with a UDM that provides UDM functions. For example, SIDF-UDM 240 may maintain subscription information for UEs 110, manage subscriptions, generate authentication credentials, handle user identification, perform access authorization based on subscription data, perform network function registration management, maintain service and/or session continuity by maintaining assignment of SMF for ongoing sessions, support SMS delivery, support lawful intercept functionality, and/or perform other processes associated with managing user data. In accordance with an exemplary implementation, SIDF-UDM 240 may be independently addressable or accessible by other devices in environment 100, as described in detail below. For example, SIDF-UDM 240 may make available or expose its SUPI de-concealment services such that other NFs in environment 100 may request SIDF-UDM 240 to perform SUPI de-concealment (e.g., decode a SUCI to identify the SUPI), as described below.

UDM 250 may include elements similar to SIDF-UDM 240, with the exception of an SIDF. For example, UDM 250 may maintain subscription information for UEs 110, manage subscriptions, generate authentication credentials, handle user identification, perform access authorization based on subscription data, perform network function registration management, maintain service and/or session continuity by maintaining assignment of SMF for ongoing sessions, support SMS delivery, support lawful intercept functionality, and/or perform other processes associated with managing user data. In some implementations, UDM 250, and other UDMs 250 in core network 130 may include SIDF devices to decode SUCIs.

Although FIG. 2 shows exemplary components core network 130, in other implementations, core network 130 may include fewer components, different components, differently arranged components, or additional components than depicted in FIG. 2. Additionally or alternatively, one or more components of core network 130 may perform functions described as being performed by one or more other components of core network 130.

In addition, while FIG. 2 depicts a single AMF 210, NRF 220, AUSF 230, SIDM-UDM 240 and UDM 250, for illustration purposes, in practice, core network 130 may include multiple AMFs 210, NRFs 220, AUSFs 230, SIDF-UDMs 240 and UDMs 250. Further, the components depicted in FIG. 2 may be implemented as dedicated hardware components, software components, a combination of hardware and software components and/or as virtualized functions implemented via a common shared physical infrastructure.

Figure 3:
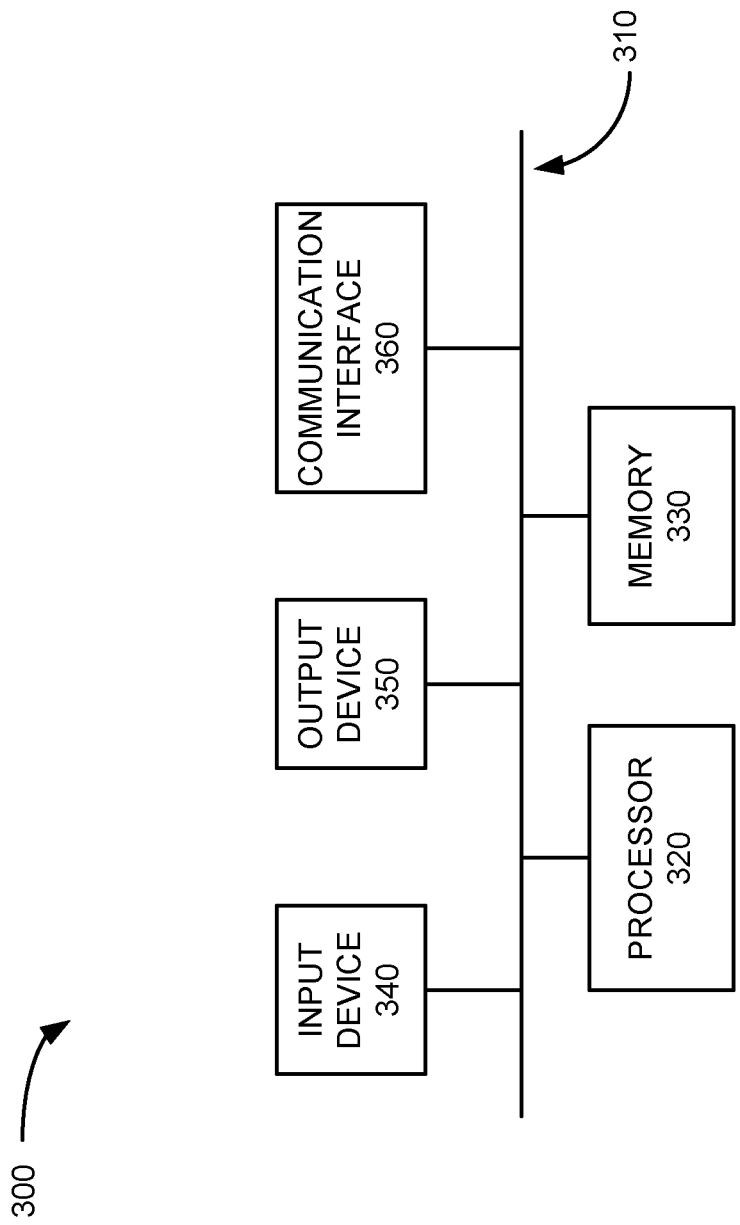
FIG. 3 is a block diagram of components associated with one or more of the elements of FIGS. 1 and 2.

FIG. 3 illustrates an exemplary configuration of a device 300. One or more devices 300 may correspond to or be included in UEs 110, base stations 125, core devices 135 and/or be used to implement one or more of core devices 135. For example, one or more devices 300 may be used to implement AMF 210, NRF 220, AUSF 230, SIDF-UDM 240 and/or UDM 250. Referring to FIG. 3, device 300 may include bus 310, processor 320, memory 330, input device 340, output device 350 and communication interface 360. Bus 310 may include a path that permits communication among the elements of device 300.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display may act as both an input device 240 and an output device 350.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Although FIG. 3 shows exemplary components of device 300, in other implementations, device 300 may include fewer components, different components, differently arranged components, or additional components than depicted in FIG. 3.

Figure 4:
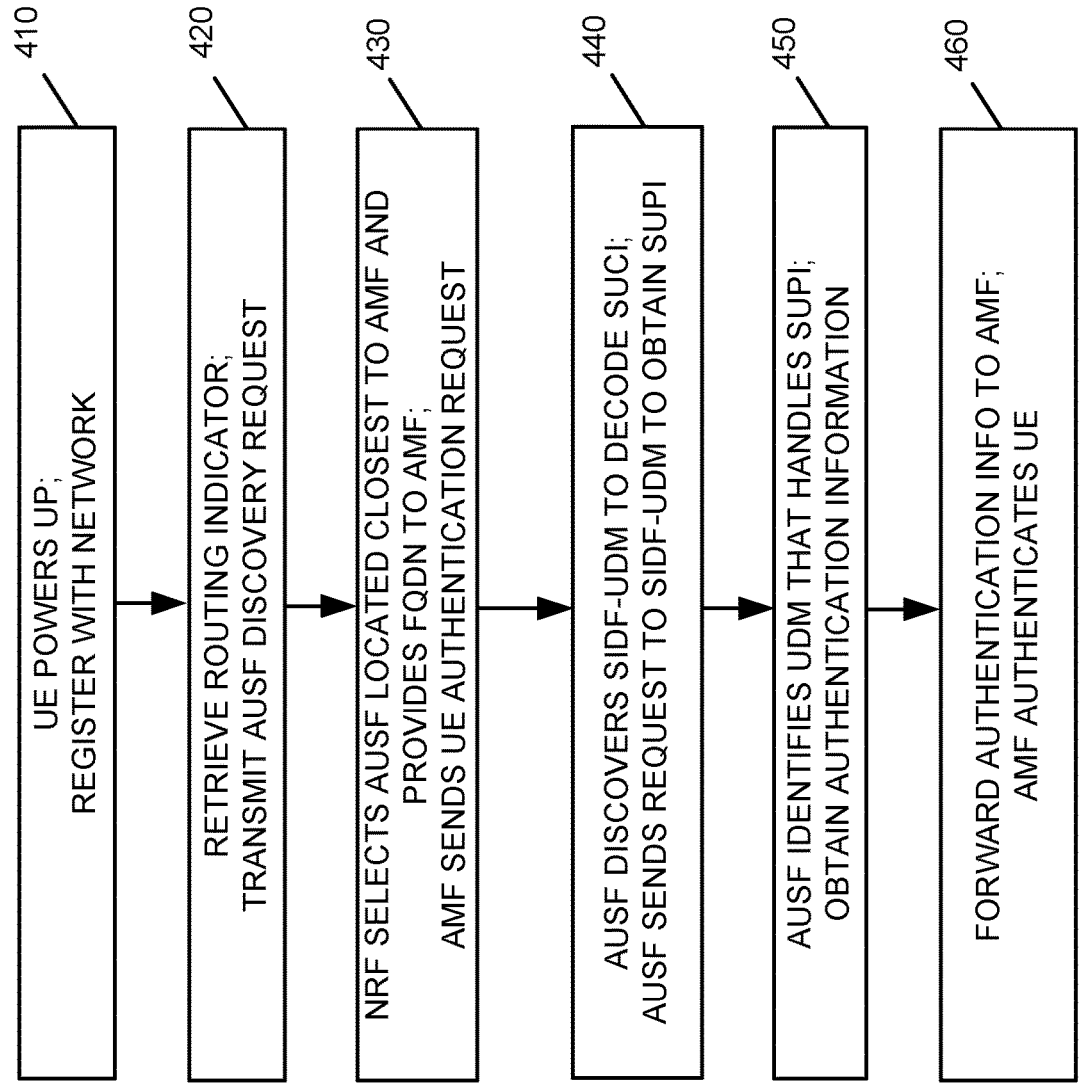
FIG. 4 is a flow diagram illustrating processing associated with authentication of user devices in accordance with an exemplary implementation.
Figure 5:
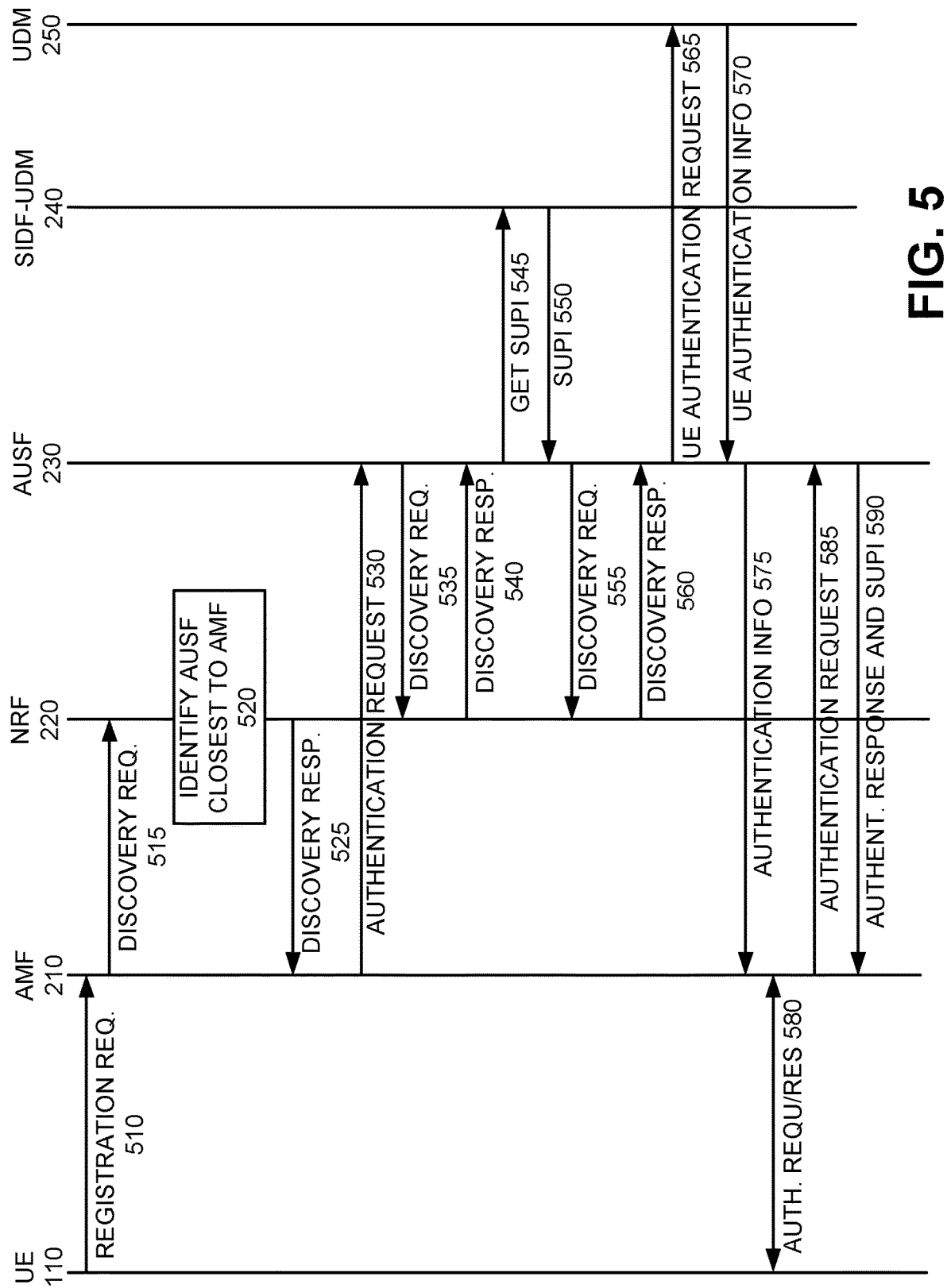
FIG. 5 is an exemplary signal flow diagram associated with the processing of FIG. 4.

FIG. 4 is a flow diagram illustrating processing associated with user device authentication in accordance with an exemplary implementation and FIG. 5 is an exemplary signal flow diagram associated with the processing of FIG. 4. Processing may begin with UE 110-1 powering up and registering with a service provider's network, such as core network 130 (block 410). For example, UE 110-1 may power up and transmit a registration request that includes UE 110-1's SUCI to AMF 210 (FIG. 5, 510). The SUPI may be provisioned to a SIM card along with one or more encryption keys for UE 110-1 at the time of manufacture of UE 110-1 and/or the SIM card. The SIM card may use the encryption key(s) to generate the SUCI for UE 110-1. In the case of an embedded SIM (eSIM) implementation, the SUPI may be provisioned at the time of eSIM generation along with one or more encryption keys that may be used to generate the SUCI. In each case, the SUCI is generated and transmitted to the network (e.g., AMF 210).

AMF 210 receives the registration request and retrieves the routing indicator from the SUCI included in the registration request (block 420). For example, in an accordance with 3GPP standards, a SUCI may include a SUCI type field, a home network identifier field, a routing indicator field, a protection scheme field, a home network public key identifier (ID) field which may identify the key used to generate the SUCI from the SUPI and a protection scheme output field which stores the encrypted SUPI. In an exemplary implementation, the routing indicator field includes 1-4 decimal digits assigned by the home network operator and may be provisioned within the SIM (e.g., a universal mobile telecommunications service SIM (USIM)) at the time of manufacture).

AMF 210 may then transmit an AUSF discovery request with the routing indicator to NRF 220 to identify an AUSF that will handle authentication for UE 110-1 (block 420; FIG. 5, 515). NRF 220 receives the AUSF discovery request and searches its database to attempt to identify an AUSF network function (NF) profile that matches the received routing indicator. In this example, assume that the routing indicator is a default indicator (e.g., 99) and NRF 220 is unable to identify an AUSF NF profile that matches the routing indicator. In other implementations, NRF 220 may bypass attempting to identify an AUSF NF profile that matches the received indicator since NRF 220 may be aware that the routing indicator does not provide relevant information for the service provider.

NRF 220 may then select or identify an AUSF 230 or AUSF instance that is located physically closest to AMF 210's location, and returns the fully qualified domain name (FQDN) of the selected AUSF 230 to AMF 210 (block 430; FIG. 5, block 520 and signal 525).

AMF 210 receives the discovery response and sends a UE Authentication request to the identified AUSF 230 along with the SUCI (block 430, FIG. 5, 530). AUSF 230 receives the authentication request and identifies the SIDF-UDM 240 that will decode the SUCI (block 440). For example, AUSF 230 sends a discovery request to NRF 220 to identify the SIDF-UDM to decode the SUCI to obtain the SUPI (FIG. 5, 535). In response, NRF 220 identifies the SIDF-UDM 240 located physically closest to AUSF 230's location and sends a discovery response identifying SIDF-UDM 240 to AUSF 230 (FIG. 5, 540).

AUSF 230 may then communicate with SIDF-UDM 240 to obtain the SUPI (block 440). For example, AUSF 230 sends a request (e.g., a hypertext transfer protocol (HTTP) get message) to SIDF-UDM 240 to decode the SUCI and obtain the concealed SUPI (FIG. 5, 545). SIDF-UDM 240 receives the message, decodes the SUCI and obtains the SUPI, which will be used for subsequent signaling. SIDF-UDM 240 may then send a message with the SUPI, such as an HTTP 200 OK message, to AUSF 230 (FIG. 5, 550).

AUSF 230 receives the SUPI from SIDF-UDM 240. AUSF 230 may then stop using the SUCI and begin using the SUPI for all subsequent signaling. For example, AUSF 230 may transmit a discovery request to NRF 220 along with the SUPI to identify the UDM 250 that handles authentication for the particular SUPI (block 450; FIG. 5, 555). NRF 220 identifies the particular UDM 250 based on the SUPI and transmits a discovery response to AUSF 230 (FIG. 5, 560). As an example, the SUPI may indicate that UE 110-1 is associated with a user located on the east coast. However, the user associated with UE 110-1 may currently be vacationing in California and is activating/registering his/her UE 110-1 to begin using UE 110-1. In this case, the appropriate UDM 250 may be located on the east coast where the user resides and NRF 220 may identify the appropriate UDM 250 storing authentication information for UE 110-1.

AUSF 230 then sends a UE authentication request to UDM 250 to obtain authentication information for UE 110-1 (block 450; FIG. 5, 565). UDM 250 receives the UE authentication request and provides the authentication information to AUSF 230 (FIG. 5, 570). AUSF 230 may then provide the UE authentication information to AMF 210 (block 460; FIG. 5, 575). AMF 210 may then perform authentication with UE 110 (block 460). For example, AMF 210 may transmit an authentication request to UE 110-1 and receive an authentication response (FIG. 5, 580). AMF 210 may then determine whether the information received from UE 110-1 matches the authentication information obtained from AUSF 230 for UE 110-1. For example, AMF 210 may hash the information provided by UE 110-1 and determine whether the hash matches the authentication information provided by AUSF 230. In this example, assume that AMF 210 authenticates UE 110-1 with the authentication information obtained from UDM 250 via AUSF 230. Alternatively, AMF 210 may transparently forward an authentication request message (e.g., UE Authentication Request) to AUSF 230 and AUSF 230 may validate the message. For example, AMF 210 may then send an authentication request with the authentication information from UE 110 (e.g., unhashed authentication information) to AUSF 230 to deliver the authentication information from UE 110-1 (FIG. 5, 585). AUSF 230 receives the authentication request, validates the authentication information from UE 110-1 and sends an authentication response along with the SUPI for UE 110-1 to AMF 210 (FIG. 5, 590). In each case, if the authentication test passes (e.g., the authentication performed by AMF 210 or the authentication performed by AUSF 230), UE 110-1 is successfully authenticated and may begin operating in environment 100. In still another alternative, AMF 210 and AUSF 230 may each perform the authentication to determine whether UE 110-1 is successfully authenticated.

In this manner, UE 110-1 may be authenticated in situations in which the routing indicator does not provide relevant information that identifies a particular UDM 250 that stores authentication information for the particular UE 110-1. By including SUCI decoding/decrypting logic in a SIDF-UDM 240, elements of core network 130 are able to authenticate UE 110-1 without using a routing indicator. In some implementations, after UE 110-1 has successfully registered and connected to core network 130, a SIM over-the-air (OTA) platform may update the SIM to replace the default routing indicator with a routing indicator that identifies the appropriate UDM 250 that stores the authentication information for UE 110-1. As a result, subsequent communications that include a SUCI may store the appropriate routing indicator.

Figure 6:
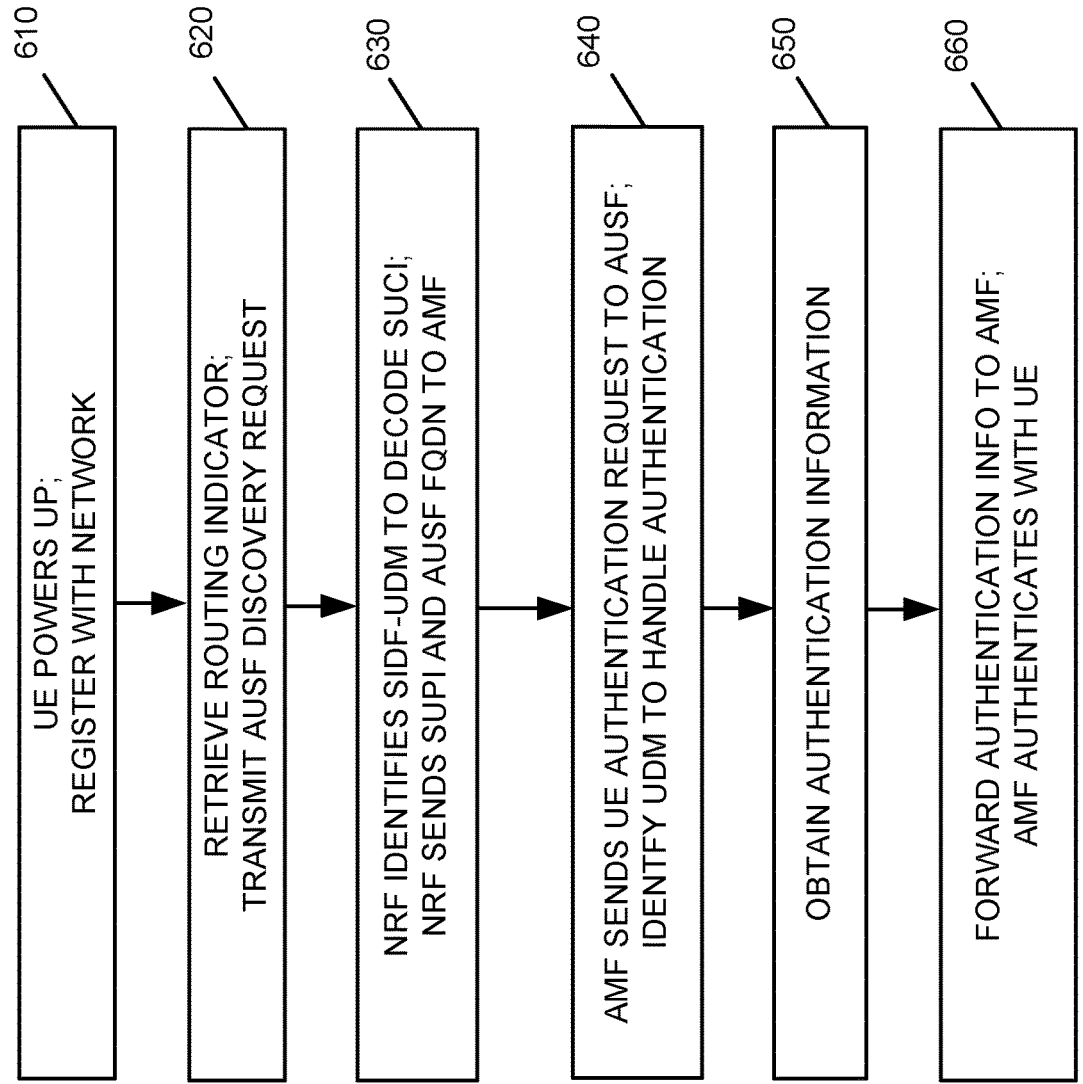
FIG. 6 is a flow diagram illustrating processing associated with authentication of user devices in accordance with another exemplary implementation.
Figure 7:
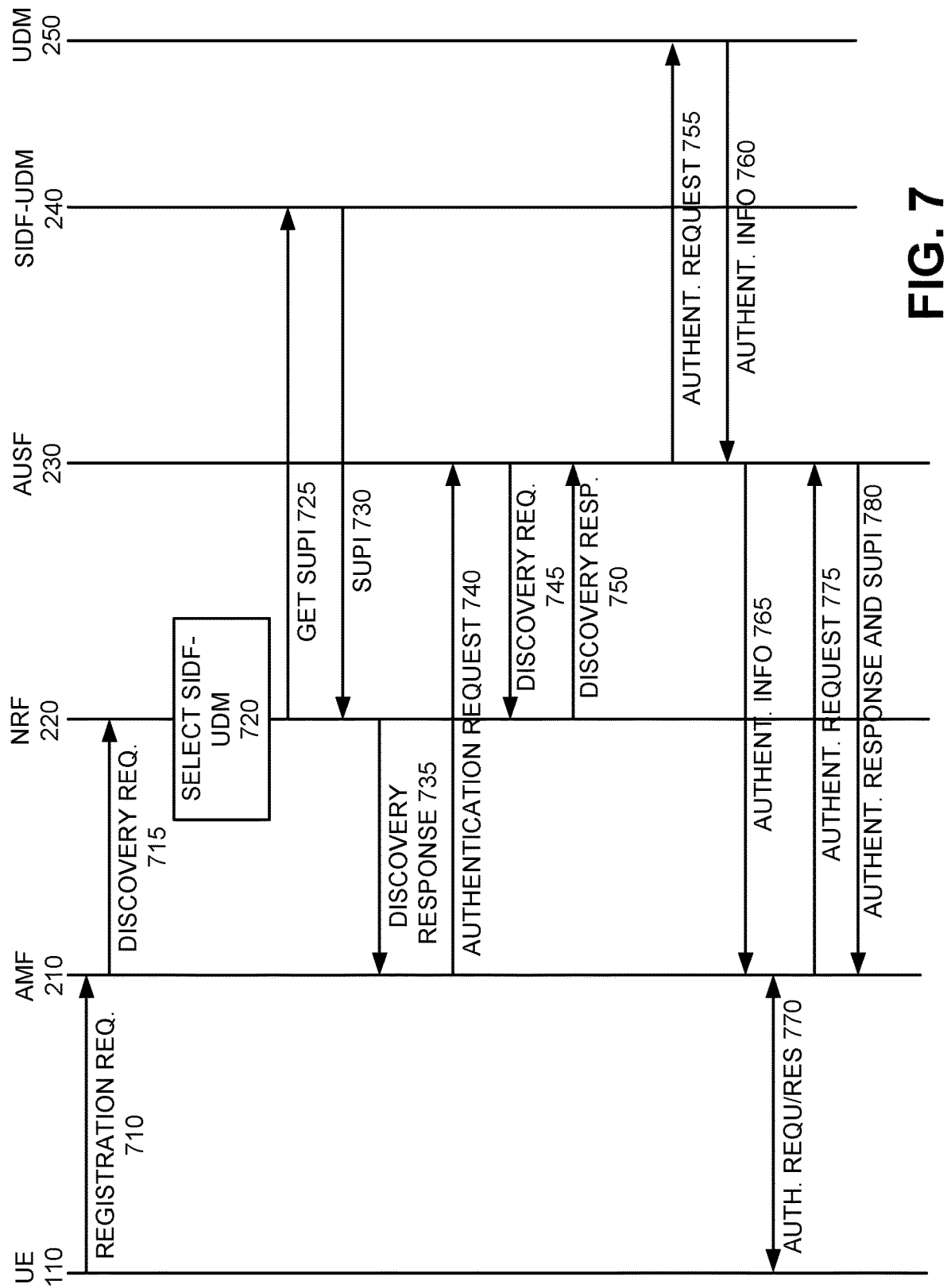
FIG. 7 is an exemplary signal flow diagram associated with the processing of FIG. 6.

FIG. 6 is a flow diagram illustrating processing associated with UE 110 authentication in accordance with another exemplary implementation and FIG. 7 is an exemplary signal flow diagram associated with the processing of FIG. 6. Processing may begin with UE 110-1 powering up and registering with a service provider's network, such as core network 130 (block 610). For example, UE 110-1 may power up and transmit a registration request that includes UE 110-1's SUCI to AMF 210 (FIG. 7, 710). As discussed previously, the SUPI may be provided in a SIM card or eSIM along with one or more encryption keys at the time of manufacture/generation. The encryption key(s) may be used to generate the SUCI for UE 110-1.

AMF 210 receives the registration request and retrieves the routing indicator from the SUCI included in the registration request (block 620). AMF 210 may then transmit an AUSF discovery request with the routing indicator to NRF 220 to identify an AUSF that will handle authentication for UE 110-1 (block 620; FIG. 7, 715). NRF 220 receives the AUSF discovery request and searches its database to attempt to identify an AUSF network function (NF) profile that matches the received routing indicator. In this example, assume that the routing indicator is a default indicator (e.g., 99) and NRF 220 is unable to identify an AUSF NF profile that matches the routing indicator. In other implementations, NRF 220 may bypass attempting to identify an AUSF NF profile that matches the routing indicator since the routing indicator may be known to include a default value that does not provide relevant information for the service provider.

NRF 220 may then select or identify an SIDF-UDM located physically closest to NRF 220 (e.g., SIDF-UDM 240) that will decode the SUCI and sends a message to the identified SIDF-UDM 240 to obtain the SUPI (block 630; FIG. 7, block 720). For example, NRF 220 may transmit an HTTP get message to SIDF-UDM 240 to decode the SUCI (FIG. 7, 725). SIDF-UDM 240 receives the message, decodes the SUCI and obtains the SUPI, which will be used for subsequent signaling. SIDF-UDM 240 may then send a message with the SUPI, such as an HTTP 200 OK message, to NRF 220 (FIG. 7, 730).

NRF 220 may then identify the AUSF instance that handles authentication for the identified SUPI and provides the SUPI and the AUSF FQDN of the identified AUSF instance to AMF 210 (block 630; FIG. 7, 735). AMF 210 may then send an authentication request to the identified AUSF along with the SUPI (block 640; FIG. 7, 740). AUSF 230 receives the authentication request and sends a discovery request to NRF 220 to identify the UDM that handles authentication for the particular SUPI (block 640; FIG. 7, 745). NRF 220 identifies the particular UDM 240 based on the SUPI and transmits a discovery response to AUSF 230 (FIG. 7, 750).

AUSF 230 may then send a UE authentication request to UDM 250 to obtain authentication information for UE 110-1 (block 650; FIG. 7, 755). UDM 250 receives the UE authentication request and provides the authentication information to AUSF 230 (FIG. 7, 760). AUSF 230 may then provide the UE authentication response which includes the authentication information to AMF 210 (block 660; FIG. 7, 765). AMF 210 may then perform authentication with UE 110 (block 660).

For example, AMF 210 may transmit an authentication request to UE 110-1 and receive an authentication response (FIG. 7, 770). AMF 210 may then determine whether the information received from UE 110-1 matches the authentication information obtained from AUSF 230. In this example, assume that AMF 210 authenticates UE 110-1 with information obtained from UDM 250 via AUSF 230. For example, AMF 210 may hash the information provided by UE 110-1 and determine that the hash matches the authentication information provided by AUSF 230. Alternatively, AMF 210 may transparently forward an authentication request message (e.g., UE Authentication Request) to AUSF 230 and AUSF 230 may validate the message. For example, AMF 210 may send an authentication request with the authentication information from UE 110-1 (e.g., unhashed authentication information) to AUSF 230 to deliver the authentication information from UE 110-1 (FIG. 7, 775). AUSF 230 receives the authentication request, validates the authentication information from UE 110-1 and provides the authentication response and SUPI to AMF 210 (FIG. 7, 780). Similar to the processing described above with respect to FIGS. 5 and 6, in this example, if the authentication test passes (e.g., the authentication performed by AMF 210 or the authentication performed by AUSF 230), UE 110-1 is successfully authenticated and may begin operating in environment 100.

In this manner, UE 110-1 may be authenticated in situations in which the routing indicator does not provide relevant information that identifies a particular UDM 250 that stores authentication information for the particular UE 110-1. By including SUCI decoding/decrypting logic in a SIDF-UDM 240, elements of core network 130 are able to authenticate UE 110-1 without using a routing indicator.

Implementations described herein may authenticate a user device without using a routing indicator. This may allow a service provider to authenticate the user device in its initial attach procedure when the SIM card for the user device does not include a relevant routing indicator for that service provider. This may also allow the service provider to geographically distribute authentication information in an efficient and scalable manner across a network based on location and/or rate center related information for the user devices. Such distribution of authentication information may also increase the speed at which a user device may be authenticated.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to certain network devices/elements identifying an SIDF to decode the SUCI. In other implementations, other devices in core network 130 may be used to identify the SIDF device.

In addition, features described above refer to an SIDF-UDM 240 decoding the SUCI to obtain the SUPI, followed by identifying a UDM 250 to provide authentication information for the UE 110. In some instances, the SIDF-UDM 240 that decodes the SUCI may also store or be co-located with the UDM database that stores authentication information for the UE 110 associated with that particular SUPI. In such implementations, the SIDF-UDM 240 that decodes the SUCI to obtain the SUPI may also provide the authentication information for UE 110.

Further, while series of acts have been described with respect to FIGS. 4 and 6 and signal flows with respect to FIGS. 5 and 7, the order of the acts and/or signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

To the extent the aforementioned implementations collect, store or employ personal information of individuals, groups or other entities, it should be understood that such information shall be used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, from a user device and by an access and mobility management function (AMF) device, a registration request that comprises a subscription concealed identifier (SUCI);
   identifying a subscriber identity de-concealing function (SIDF) device to decode the SUCI;
   forwarding the SUCI to the SIDF device;
   decoding, by the SIDF device, the SUCI to identify a subscription permanent identifier (SUPI);
   identifying, by a network repository function (NRF) device, a unified data management (UDM) device associated with the identified SUPI;
   transmitting, by an authentication server function (AUSF) device, an authentication request to the identified UDM device to obtain authentication information associated with the user device;
   receiving, by the AUSF device, the authentication information; and
   authenticating the user device based on the received authentication information.

2. The method of claim 1, wherein identifying the SIDF device comprises:
   transmitting, by the AMF device, a discovery request to the NRF device.

3. The method of claim 2, wherein the identifying the SIDF device further comprises:
   selecting, by the NRF device, the AUSF device located closest to the AMF device, and
   transmitting, by the AMF device and to the selected AUSF device, a message including the SUCI, and
   wherein the AUSF device transmits a message including the SUCI to the SIDF device and receives, from the SIDF device, the SUPI.

4. The method of claim 3, further comprising:
   using, by the AUSF device, the SUPI for subsequent signaling after the SUPI is received.

5. The method of claim 2, wherein identifying the SIDF device comprises:
   identifying, by the NRF device, the SIDF device to decode the SUCI.

6. The method of claim 5, further comprising:
   transmitting, by the NRF device, a message including the SUCI to the SIDF device; and
   receiving, from the SIDF device, the SUPI.

7. The method of claim 1, further comprising:
   providing the SUPI to the AUSF device.

8. The method of claim 1, wherein the SIDF device is included in or co-located with a second UDM device.

9. The method of claim 1, wherein the identifying the UDM device is performed without using a routing indicator included in the SUCI.

10. A system, comprising:
    at least one device comprising at least one processor, wherein the at least one device is configured to:
    receive, from a user device, a registration request that comprises a subscription concealed identifier (SUCI);
    identify a network element to decode the SUCI;
    forward the SUCI to the identified network element;
    decode the SUCI to identify a subscription permanent identifier (SUPI);
    identify a unified data management (UDM) device associated with the identified SUPI;
    transmit an authentication request to the identified UDM device to obtain authentication information associated with the user device;
    receive the authentication information; and
    authenticate the user device based on the received authentication information.

11. The system of claim 10, wherein the at least one device comprises:

an access and mobility management function (AMF) device, a network repository function (NRF) device, an authentication server function (AUSF) device, a subscriber identity de-concealing function (SIDF) device and the UDM device.

12. The system of claim 11, wherein the registration request is received by the AMF device and wherein when identifying the network element, the at least one device is further configured to:

transmit, by the AMF device, a discovery request to the NRF device.

13. The system of claim 12, wherein when identifying the network element, the at least one device is further configured to:

select, by the NRF device, an authentication server function (AUSF) device located closest to the AMF device;

transmit, by the AMF device and to the selected AUSF device, a message including the SUCI;

identify a subscriber identity de-concealing function (SIDF) device to decode the SUCI;

transmit, by the AUSF device, a message including the SUCI to the SIDF device; and receive, from the SIDF device, the SUPI.

14. The system of claim 13, wherein the at least one device is further configured to:

use, by the AUSF device, the SUPI for subsequent signaling after the SUPI is received.

15. The system of claim 11, wherein the registration request is received by the AMF device, and wherein when identifying the network element, the at least one device is further configured to:

identify, by the NRF device, a subscriber identity de-concealing function (SIDF) device to decode the SUCI.

16. The system of claim 15, wherein the at least one device is further configured to:

transmit, by the NRF device, a message including the SUCI to the SIDF device; and receive, from the SIDF device, the SUPI.

17. The system of claim 11, wherein the at least one device is further configured to:

provide, by the SIDF device, the SUPI to the AUSF device.

18. The system of claim 10, wherein the at least one device is configured to identify the UDM device without using a routing indicator included in the SUCI.

19. A non-transitory computer-readable medium having stored thereon sequences of instructions which, when executed by at least one processor, cause the at least one processor to:

receive a request to identify a subscriber identity de-concealing function (SIDF) device associated with a subscription concealed identifier (SUCI) included in a registration request from a user device;

identify the SIDF device to decode the SUCI;

forward the SUCI to the identified SIDF device;

receive, from the SIDF device, the SUPI;

identify a unified data management (UDM) device associated with the SUPI;

transmit an authentication request to the identified UDM device to obtain authentication information associated with the user device;

receive, from the UDM device, the authentication information; and forward the authentication information to an access mobility function (AMF) device, wherein the authentication information is to be used to authenticate the user device.

20. The non-transitory computer-readable medium of claim 19, wherein the instructions further cause the at least one processor to:

identify the UDM device without using a routing indicator included in the SUCI.

* * * * *